(12) United States Patent  
Vermunt et al.

(10) Patent No.: US 11,113,484 B2  
(45) Date of Patent: Sep. 7, 2021

(54) CONSUMABLE PRODUCT AND METHOD OF PROVIDING THE SAME

(71) Applicant: NXP B.V., Eindhoven (NL)

(72) Inventors: Franciscus Maria Vermunt, Waalre (NL); Nguyen Trieu Luan Le, Cormelles le Royal (FR); Arnaud Pignorel, Verson (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/774,582

(22) Filed: Jan. 28, 2020

(65) Prior Publication Data

US 2020/0250388 A1    Aug. 6, 2020

(30) Foreign Application Priority Data

Feb. 5, 2019   (EP) .................................. 19305134.9

(51) Int. Cl.
| | |
|---|---|
| *G06K 7/10* | (2006.01) |
| *G06K 19/07* | (2006.01) |
| *G06Q 30/00* | (2012.01) |

(52) U.S. Cl.
CPC ..... *G06K 7/10366* (2013.01); *G06K 19/0723* (2013.01); *G06Q 30/0185* (2013.01)

(58) Field of Classification Search
CPC ........... G06K 7/10366; G06K 19/0723; G06Q 30/0185

(Continued)

(56) References Cited

U.S. PATENT DOCUMENTS

| 7,492,326 B1 | 2/2009 | Bodlovic et al. |
| 2002/0085847 A1* | 7/2002 | Yoshida ................. G03G 15/55 399/12 |

(Continued)

FOREIGN PATENT DOCUMENTS

| CN | 105401382 A | 3/2016 |
| CN | 103726262 B | 4/2016 |

(Continued)

OTHER PUBLICATIONS

Gao, Yang et al.; "Moisture-Triggered Physically Transient Electronics;" Science Advances; American Association for the Advancement of Science; Science Advances Sep. 1, 2017, vol. 3 No. 9; DOI: 10.1126/sciadv.1701222.

(Continued)

*Primary Examiner* — Toan C Ly

(57) ABSTRACT

In accordance with a first aspect of the present disclosure, a consumable product is provided, comprising: one or more consumable components; a radio frequency communication tag; wherein said radio frequency communication tag comprises data indicative of a type of consumable component to which said consumable components belong. In accordance with a second aspect of the present disclosure, a machine is provided, being configured to operate using a consumable product of the kind set forth; wherein said machine comprises a reader configured to read data from the radio frequency communication tag of the consumable product. In accordance with a third aspect of the present disclosure, a method of providing a consumable product is conceived, comprising: including one or more consumable components in the consumable product; including a radio frequency communication tag in the consumable product; wherein said radio frequency communication tag comprises data indica- (Continued)

300

↓

302
Including one or more consumable components in a consumable product

↓

304
Including a radio frequency communication tag in the consumable product, wherein said radio frequency communication tag comprises data indicative of a type of consumable component to which said consumable components belong tive of a type of consumable component to which said consumable components belong.

16 Claims, 2 Drawing Sheets

(58) Field of Classification Search
USPC ........................................................ 235/451
See application file for complete search history.

(56) References Cited

U.S. PATENT DOCUMENTS

| | | |
|---|---|---|
| 2005/0008376 A1 | 1/2005 | Parry et al. |
| 2007/0044820 A1 | 3/2007 | Chan et al. |
| 2008/0190808 A1 | 8/2008 | Patel et al. |
| 2010/0154484 A1 | 6/2010 | Skoric et al. |
| 2010/0305430 A1 | 12/2010 | Troesken |
| 2011/0087367 A1 | 4/2011 | Gadini et al. |
| 2011/0146715 A1 | 6/2011 | Rolek |
| 2012/0021965 A1* | 1/2012 | Bastigkeit .......... C11D 3/38663 510/393 |
| 2014/0012764 A1* | 1/2014 | Kruglick ................ G06Q 10/30 705/308 |
| 2014/0015644 A1 | 1/2014 | Amann et al. |
| 2017/0249442 A1* | 8/2017 | Hagen .................... G16H 40/63 |

FOREIGN PATENT DOCUMENTS

| | | |
|---|---|---|
| DE | 10253567 A1 | 5/2004 |
| DE | 102008005363 A1 | 10/2008 |
| DE | 102007051340 A1 | 4/2009 |
| DE | 102014114963 A1 | 4/2016 |
| EP | 2698745 A1 | 2/2014 |
| IN | 227842 B | 3/2009 |
| KR | 101198212 B1 | 11/2012 |

OTHER PUBLICATIONS

Géczy, Attila et al.; "Experimental 13.56 MHz RFID Cards on Biodegradable Substrates;" 38th International Spring Seminar on Electronics Technology, May 6-10, 2015, pp. 52-56, Eger, Hungary.

* cited by examiner

CONSUMABLE PRODUCT AND METHOD OF PROVIDING THE SAME

CROSS-REFERENCE TO RELATED APPLICATIONS

This application claims priority under 35 U.S.C. § 119 to European Patent Application No. 19305134.9, filed on Feb. 5, 2019, the contents of which are incorporated by reference herein.

TECHNICAL FIELD

The present disclosure relates to a consumable product. Furthermore, the present disclosure relates to a method of providing a consumable product.

BACKGROUND

Consumable products, such as detergent tablets for dishwashers, are often composed of different consumable components. For example, a detergent tablet may be an all-in-one tablet, which includes soap, rinse aid, and salt, in a certain composition.

SUMMARY

In accordance with a first aspect of the present disclosure, a consumable product is provided, comprising: one or more consumable components; a radio frequency communication tag; wherein said radio frequency communication tag comprises data indicative of a type of consumable component to which said consumable components belong.

In an embodiment, the radio frequency communication tag further comprises data indicative of a quantity of said consumable components.

In an embodiment, the quantity is an absolute quantity or a relative quantity. In an embodiment, the radio frequency communication tag further comprises operating instructions for a machine configured to operate using the consumable product.

In an embodiment, the radio frequency communication tag further comprises data indicative of a suitability of the consumable product.

In an embodiment, the radio frequency communication tag is a biodegradable tag.

In an embodiment, the radio frequency communication tag is a radio frequency identification tag or a near field communication tag.

In an embodiment, the radio frequency communication tag comprises an energy harvesting circuit.

In an embodiment, the consumable product is a detergent tablet for a dishwasher.

In accordance with a second aspect of the present disclosure, a machine is provided, being configured to operate using a consumable product of the kind set forth; wherein said machine comprises a reader configured to read data from the radio frequency communication tag of the consumable product.

In an embodiment, the reader is further configured to provide energy to the radio frequency communication tag.

In an embodiment, the machine further comprises control logic configured to control an operation of the machine in dependence on said data.

In an embodiment, said control logic is further configured to control a process of dissolving the consumable product.

In accordance with a third aspect of the present disclosure, a method of providing a consumable product is conceived, comprising: including one or more consumable components in the consumable product; including a radio frequency communication tag in the consumable product; wherein said radio frequency communication tag comprises data indicative of a type of consumable component to which said consumable components belong.

In an embodiment, the radio frequency communication tag is a biodegradable tag.

DESCRIPTION OF DRAWINGS

Embodiments will be described in more detail with reference to the appended drawings, in which.

DESCRIPTION OF EMBODIMENTS

Consumable products, such as detergent tablets for dishwashers, are often composed of different consumable components. For example, a detergent tablet may be an all-in-one tablet, which includes soap, rinse aid, and salt, in a certain composition. However, a machine that is configured to operate using such a tablet—e.g. a dishwasher—may not take full advantage of the detergent tablet's properties. More specifically, a dishwasher often has a static setup for the salt, soap, rinse aid, and water hardness. In that case, it is not possible to select the best machine setup for an all-in-one detergent tablet.

Figure 1:
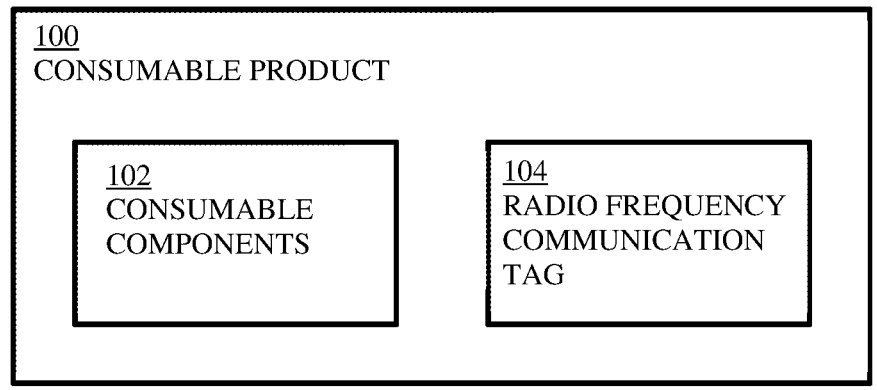
FIG. 1 shows an illustrative embodiment of a consumable product.

FIG. 1 shows an illustrative embodiment of a consumable product 100. The consumable product 100 comprises one or more consumable components 102 and a radio frequency communication tag 104. The radio frequency communication tag 104 comprises data indicative of a type of consumable component to which said consumable components 102 belong. In this way, a machine that operates using the consumable product 100 can easily query the consumable product 100 for its properties. For instance, the machine may read data from the radio frequency communication tag 104. Since these data are indicative of the type of consumable component or components comprised in the consumable product 100, the machine can optimize its operation based on the type of consumable component or components. For example, a dishwasher can query a soap tablet for its capabilities and adjust its operation accordingly. An optimized machine operation may for example result in energy saving and water saving.

In an embodiment, the radio frequency communication tag 104 further comprises data indicative of a quantity of the consumable components 102. Furthermore, in an embodiment, the quantity is an absolute quantity or a relative quantity. For instance, if the consumable components 102 are soap, rinse aid, and salt, then the data may be indicative of the absolute quantity of these components (e.g. expressed in grams) or of the relative quantity of these components (e.g. expressed as a ratio or a percentage). In this way, the machine may further optimize its operation based on the quantity of the consumable components 102.

In an embodiment, the radio frequency communication tag 104 further comprises operating instructions for a machine configured to operate using the consumable product 100. In this way, specific operating instructions may easily be provided to the machine, to further optimize its operation. In an embodiment, the radio frequency communication tag further comprises data indicative of a suitability of the consumable product. In this way, it can be avoided that a machine malfunctions as a result of providing it with an unsuitable consumable product. For instance, based on these data, a dishwasher tablet can be refused in a washing machine and vice versa. Furthermore, in an embodiment, the radio frequency communication tag 104 is a biodegradable tag. Accordingly, the machine's operation can be optimized in an environment-friendly manner. In a practical and effective implementation, the radio frequency communication tag 104 is a radio frequency identification (RFID) tag or a near field communication (NFC) tag. Furthermore, in an embodiment, the radio frequency communication tag 104 comprises an energy harvesting circuit. In this way, the radio frequency communication tag 104 does not need to have a costly energy storage unit, such as a battery, because the radio frequency communication tag 104 will be able to harvest energy from a radio frequency field generated by the machine.

Figure 2:
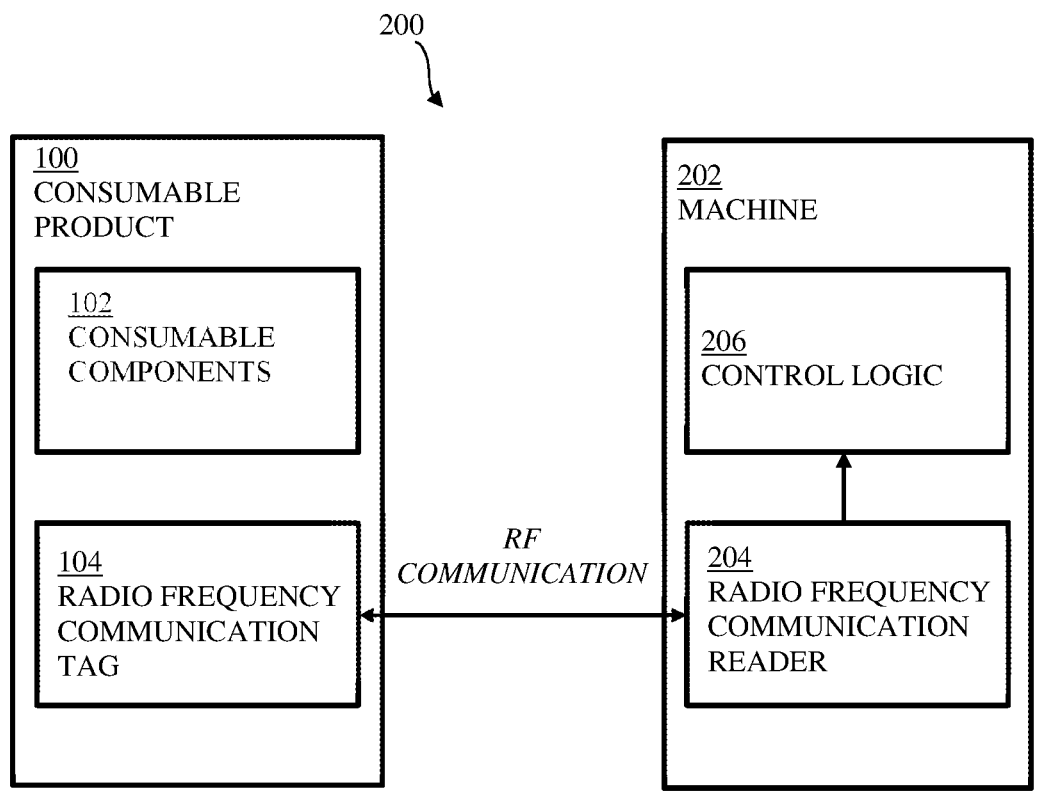
FIG. 2 shows an illustrative embodiment of a system using a consumable product.

FIG. 2 shows an illustrative embodiment of a system 200 using a consumable product 100. The system 200 comprises a consumable product 100 of the kind set forth above. In addition, the system 200 comprises a machine 202 configured to operate using the consumable product 100. For instance, if the consumable product 100 is a detergent tablet, then the machine 202 may be a dishwasher. The machine 202 includes a radio frequency communication reader 204, which is configured to read data from the radio frequency communication tag 104, through a radio frequency (RF) communication channel. These data may be indicative of a type of component to which the consumable components 102 belong, an absolute quantity of the consumable components 102, and/or a relative quantity of the consumable components 102. Furthermore, the radio frequency communication reader 204 may be configured to read operating instructions from the radio frequency communication tag 104. The data and the operating instructions may be forwarded to control logic 206 of the machine 202. The control logic 206 may be configured to control the operation of the machine 202 in dependence on the data and/or the operating instructions.

Thus, in accordance with the present disclosure, a machine 202 is provided, which is configured to operate using a consumable product 100 of the kind set forth. The machine 202 comprises a radio frequency communication reader 204 configured to read data from the radio frequency communication tag 104 of the consumable product 100. In an embodiment, the radio frequency communication reader 204 is further configured to provide energy to the radio frequency communication tag 104. Accordingly, the radio frequency communication tag 104 may not need to contain a costly energy storage unit, such as a battery. Furthermore, in an embodiment, the machine 202 comprises control logic 206 configured to control an operation of the machine in dependence on said data. In an embodiment, the control logic 206 is further configured to control a process of dissolving the consumable product 100. In particular, the dissolving process may be time-controlled process, to support a correct transmission of information from the radio frequency communication tag 104 to the radio frequency communication reader 204.

Figure 3:
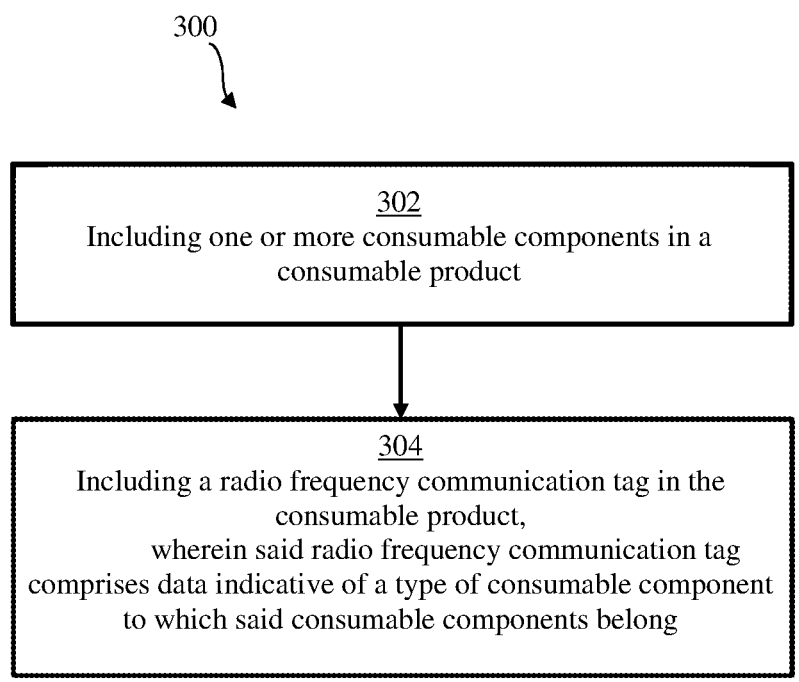
FIG. 3 shows an illustrative embodiment of a method of providing a consumable product.

FIG. 3 shows an illustrative embodiment of a method 300 of providing a consumable product. The method 300 comprises, at 302, including one or more consumable components in a consumable product. Furthermore, the method 300 comprises, at 304, including a radio frequency communication tag in the consumable product, wherein said radio frequency communication tag comprises data indicative of a type of consumable component to which said consumable components belong. In this way, a machine that operates using the consumable product can easily query the consumable product for its properties.

Thus, in accordance with the present disclosure, a contactless and biodegradable tag may be added to an all-in-one consumable product, for instance to a detergent table that includes soap, rinse aid, and salt. Then, a machine such as a dishwasher may query the detergent tablet for its properties. For this purpose, a tag reader may have been placed near the soap box of the dishwasher. These properties may include, for example, the type of components included in the tablet (i.e. soap, rinse aid, salt), the absolute quantity of these components, or the relative quantity of these components. Subsequently, the dishwasher may adjust its washing program in accordance with the properties of the detergent tablet, for instance to save energy and water. For example, the dishwasher may adjust its washing program by using its internal components to fill up or extend the components in the detergent tablet to the level(s) required for execution. Since the tag may be biodegradable, it may dissolve in water. Thus, the tag itself may also be consumable, like the detergent tablet, such that adding the tag does not negatively affect the environment.

It is noted that a tag of the kind set forth may be applied to any equipment that operates using consumable products. In other words, the detergent tablet and dishwasher are only non-limiting examples of a consumable product and machine of the kind set forth. Other non-limiting examples include a washing machine, a vacuum cleaner, and a wet carpet cleaner. A further non-limiting example is a coffee maker: if coffee is put in the machine using a coffee pod, then the coffee pod can contain a tag of the kind set forth, to inform the coffee maker about, for example, water temperature constraints. Furthermore, if coffee beans are put in the machine with its bag, then the bag may contain a tag of the kind set forth, to inform the coffee maker about, for example, water temperature constraints and the type of grinding needed. Thus, a coffee pod or bag may be regarded as consumable products of the kind set forth.

In more detail, an implementation may have the following form. A contactless tag may be enclosed inside the detergent tablet. The tablet contains at least one of soap, rinse aid, and salt. Furthermore, the tag may contain at least an antenna, a power harvester (i.e., an energy harvesting circuit), and a transmitter coupled to a memory. The tag may operate according to known contactless protocols, such as NFC. The memory may contain information describing the properties of the tablet, for example the type of components contained in the tablet, i.e. soap, rinse aid, and/or salt, and the percentage of soap, rinse aid and/or salt. This information will be transmitted by the tag to the washing machine to determine the optimum washing setting. The dishwasher may contain a reader capable of providing power to the tag in a contactless manner by means of magnetic or electromagnetic waves and capable of reading the tablet's properties from the tag memory. Advantageously, when the user switches on the washing machine, the reader may start emitting magnetic or electromagnetic waves.

The tag may convert the received signals at its antenna into electrical supply power and may start sending information contained in its memory by means of load modulation or back-scattering if the power level is sufficient. The tag may repeat the steps of sending information contained in the memory at regular intervals, as long as it receives sufficient power from the reader and as long as it has not dissolved. To support a correct transmission of said information, the process of dissolving can be a time-controlled process. After a successful data reception from the tag, the reader may terminate the communication by stopping the emission of magnetic or electromagnetic waves. The reader may then transmit the information received from the tag to the dishwasher's processor, which determines the most effective and efficient washing setting based on said information.

As mentioned above, the tag may be biodegradable. Technologies have been developed to enable the production of physically transient electronics, including antennas and electronic elements such as resistors and transistors. Such a technology has been described, for example, in the article "Moisture-triggered physically transient electronics", written by Yang Gao et al. and published in Science Advances (ISSN 2375-2548) by the American Association for the Advancement of Science, Washington, 2017. An electronic circuit, such as a tag, produced by means of these technologies can be dissolved in water. During the washing cycle the tag embedded in the tablet will be exposed to water in the washing machine, so that it will be dissolved. As mentioned above, the process of dissolving can be a time-controlled process.

Alternatively, if the tag is not biodegradable, it may be caught by the machine, for example by means of a magnet. In particular, the tag may also contain data indicative of a biodegradable compatibility and the control logic of the machine may decide to activate the "auto-destruction" of the tag based on these data. If the tag is not biodegradable, it may be caught by the machine and a special process may be applied to dissolve it.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 consumable product
102 consumable components
104 radio frequency communication tag
200 system using a consumable product
202 machine
204 radio frequency communication reader
206 control logic
300 method of providing a consumable product
302 including one or more consumable components in a consumable product
304 including a radio frequency communication tag in the consumable product, wherein said radio frequency communication tag comprises data indicative of a type of consumable component to which said consumable components belong

The invention claimed is:

1. A consumable product comprising:
one or more consumable components; and
a radio frequency communication tag;
wherein said radio frequency communication tag comprises data indicative of a type of consumable component to which said consumable components belong, wherein the radio frequency communication tag further comprises data indicative of a suitability of the consumable product, wherein the radio frequency communication tag further comprises operating instructions for a machine configured to operate using the consumable product, and wherein in response to a consumable component of the one or more consumable components being determined to be unsuitable for a machine configured to operate using the one or more consumable components, the consumable product is refused and the machine does not operate with the consumable product.

2. The consumable product of claim 1, wherein the radio frequency communication tag further comprises data indicative of a quantity of said consumable components.

3. The consumable product of claim 2, wherein the quantity is an absolute quantity or a relative quantity.

4. The consumable product of claim 1, wherein the radio frequency communication tag is a biodegradable tag.

5. The consumable product of claim 1, wherein the radio frequency communication tag is a radio frequency identification tag or a near field communication tag.

6. The consumable product of claim 1, wherein the radio frequency communication tag comprises an energy harvesting circuit.

7. The consumable product of claim 1, being a detergent tablet for a dishwasher.

8. A machine configured to operate using the consumable product of claim 1, wherein said machine comprises a reader configured to read data from the radio frequency communication tag of the consumable product.

9. The machine of claim 8, wherein the reader is further configured to provide energy to the radio frequency communication tag.

10. The machine of claim 8, further comprising control logic configured to control an operation of the machine in dependence on said data.

11. The machine of claim 10, wherein said control logic is further configured to control a process of dissolving the consumable product.

12. A method of providing a consumable product, comprising:
including one or more consumable components in the consumable product; and
including a radio frequency communication tag in the consumable product;
wherein said radio frequency communication tag comprises data indicative of a type of consumable component to which said consumable components belong, wherein the radio frequency communication tag further comprises data indicative of a suitability of the consumable product, wherein the radio frequency communication tag further comprises operating instructions for a machine configured to operate using the consumable product, and wherein in response to a consumable component of the one or more consumable components being determined to be unsuitable for a machine configured to operate using the one or more consumable components, the consumable product is refused and the machine does not operate with the consumable product.

13. The method of claim 12, wherein the radio frequency communication tag further comprises data indicative of a quantity of said consumable components.

14. The method of claim 13, wherein the quantity is an absolute quantity or a relative quantity.

15. The method of claim 12, wherein the radio frequency communication tag is a biodegradable tag.

16. The method of claim 12, wherein the radio frequency communication tag is a radio frequency identification tag or a near field communication tag.

* * * * *